United States Patent [19]

Ramun et al.

[11] Patent Number: 4,686,767
[45] Date of Patent: * Aug. 18, 1987

[54] METAL CUTTING SHEAR FOR A BACKHOE

[75] Inventors: Michael Ramun; John Ramun, both of Youngstown, Ohio

[73] Assignee: Allied Gator, Inc., Youngstown, Ohio

[*] Notice: The portion of the term of this patent subsequent to Jun. 9, 2004 has been disclaimed.

[21] Appl. No.: 856,017

[22] Filed: Apr. 25, 1986

[51] Int. Cl.[4] ............................................. B23P 19/00
[52] U.S. Cl. ....................................... 30/134; 30/228; 30/258; 144/34 E; 414/740
[58] Field of Search .................. 30/131, 134, 225, 228, 30/231, 258; 83/609; 144/34 E; 294/104; 414/722, 724, 740

[56] References Cited

U.S. PATENT DOCUMENTS

| | | | |
|---|---|---|---|
| 4,188,721 | 2/1980 | Ramun et al. | 30/134 |
| 4,198,747 | 4/1980 | LaBounty | 30/134 |
| 4,376,340 | 3/1983 | Ramun et al. | 30/134 |
| 4,403,431 | 9/1983 | Ramun et al. | 30/134 X |
| 4,439,921 | 4/1984 | Ramun et al. | 30/134 |
| 4,450,625 | 5/1984 | Ramun et al. | 30/134 |
| 4,519,135 | 5/1985 | LaBounty | 30/134 |
| 4,543,719 | 10/1985 | Pardoe | 30/134 |
| 4,558,515 | 12/1985 | LaBounty | 30/134 |

Primary Examiner—E. R. Kasenske
Assistant Examiner—Michael D. Folkerts
Attorney, Agent, or Firm—Harpman & Harpman

[57] ABSTRACT

A material handling and metal shear attachment for a backhoe is mounted on the boom or dipstick of a backhoe for actuation by the hydraulic system of the backhoe. A fixed blade is pivotally secured to the boom or dipstick and a movable cutting blade is pivoted to the fixed blade, a hydraulic piston and cylinder assembly mounted on the fixed blade moves the movable cutting blade in shearing relation to the fixed blade. The fixed and movable blades are shaped and positioned relative to their pivotal engagement to move objects being sheared towards the blades pivotal engagement rather than away therefrom.

21 Claims, 9 Drawing Figures

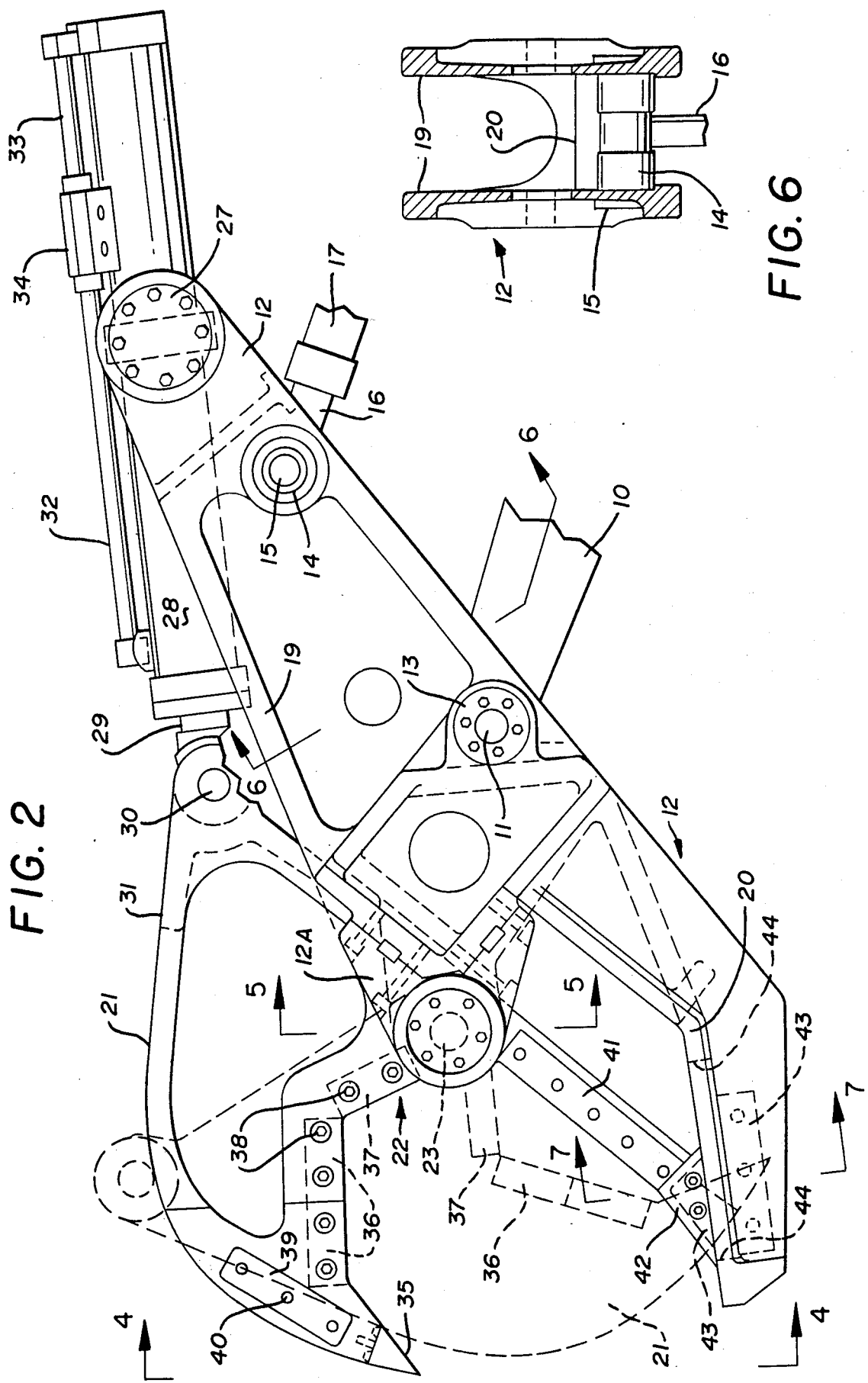

METAL CUTTING SHEAR FOR A BACKHOE

BACKGROUND OF THE INVENTION

1. Related Application

This application is related to copending allowed application serial number 801,468, which is directed to the shear of the present invention in combination with a mounting adapter.

2. Field of the Invention

This invention relates to heavy duty shears of the type that are mounted on backhoes and powered by hydraulic cylinders for the efficient handling of scrap and especially metal scrap and shearing the same into reuseable scrap sizes. Metal scrap from industrial buildings being dismantled occurs in many different forms and sizes from pipes of various diameters and lengths to structural beams such as I-beams, channels, angles, and the like and metal sheets and plates and various automobile and truck frames, railroad cars and the like and wherein the shear must be able to pick up, move and cut the metal pieces regardless of size or shape and without any wedging or binding action of the work pieces relative to the shears.

3. Description of the Prior Art

Prior devices of this type are best represented in our U.S. Pat. Nos. 4,188,721, 4,376,340, 4,403,431, and 4,450,625.

Other prior art is represented by U.S. Pat. Nos. 4,198,747 and 4,519,135.

In the present invention, there is a single unitary cast fixed blade and a single unitary cast movable blade pivoted to the fixed blade with the fixed blade being detachably secured to the boom or dip stick of a backhoe or the like. The hydraulic system of the backhoe or the like includes a piston and cylinder assembly, the piston of which engages the fixed blade for moving the same and the shear in pivotal relation to the boom or dip stick.

Summary of the Invention

The metal cutting shear for mounting on a backhoe comprises a fixed blade having a movable blade pivoted thereto, the fixed blade being pivotally mounted on the end of a boom or dip stick of a back hoe in place of the normal bucket. A piston and cylinder on the boom of the backhoe engages the fixed blade so as to impart pivotal motion thereto and a second piston and cylinder on the fixed blade engages the movable blade so as to move it in a shearing relation with respect to the fixed blade. Both blades are unitary cast steel and have detachable hardened cutting bars with the movable blade having a V-shaped cutting edge configuration. The fixed blade has an open slot therein beyond a straight cutting edge that forms means for confining the movable blade to a path alongside the fixed blade where it will operate to move objects being sheared toward the blade's pivotal engagement rather than away therefrom when it is moved by the hydraulic piston and cylinder.

DESCRIPTION OF THE DRAWINGS

FIG. 2 is an enlarged side elevation of the shear illustrated in FIG. 1;

FIG. 6 is a cross section on line 6—6 of FIG. 2;

DESCRIPTION OF THE PREFERRED EMBODIMENT

Backhoes, such as used in industry, are powered machines having an extensible boom and hydraulic controlled piston and cylinders mounted thereon. A dip stick is normally pivotally attached to the boom and a bucket is normally attached to the end of the dip stick and is moved by one or more hydraulic piston and cylinder assemblies comprising part of the hydraulic system of the backhoe.

Applicants' device is an attachment for a backhoe that is used in place of the bucket for handling, shearing and moving structural beams, pipes, cables, and other structural members and the like normally found in structures being dismantled.

Figure 1:
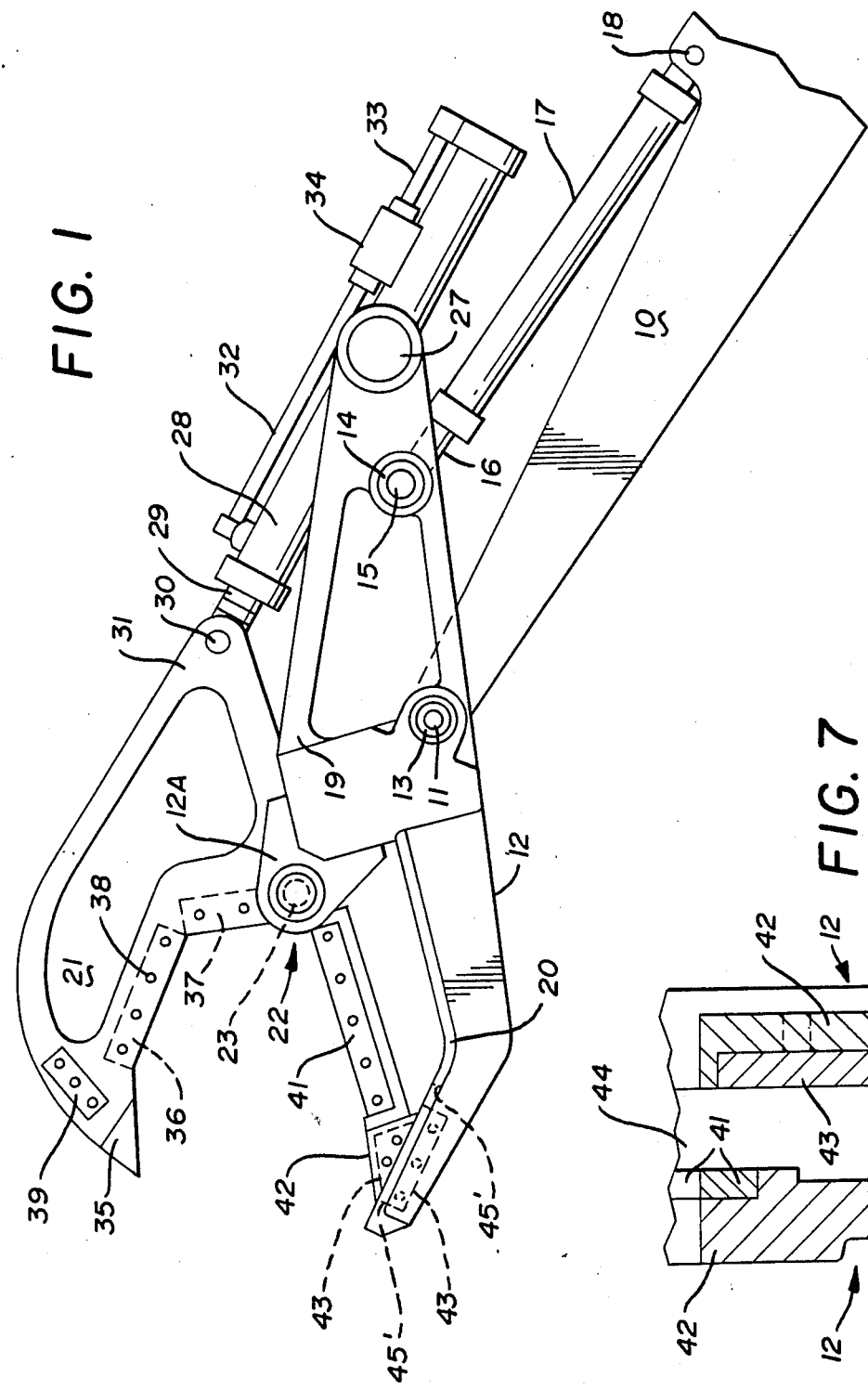
FIG. 1 is a side elevation of the metal cutting shear mounted on the boom or dip stick of a backhoe.
Figure 7:
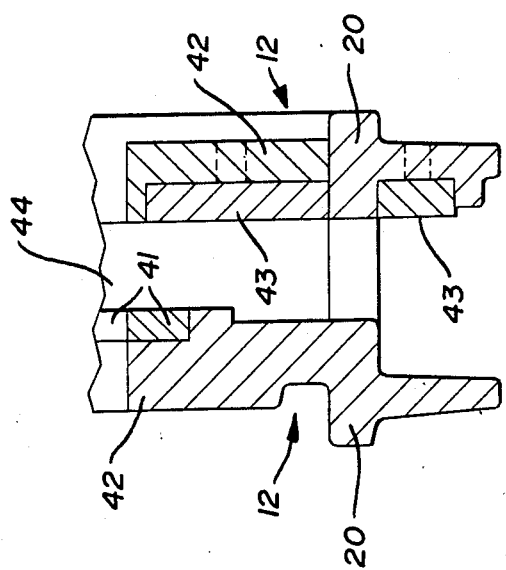
FIG. 7 is an enlarged cross section on line 7—7 of FIG. 2.

As will be seen in FIG. 1 of the drawings, a backhoe boom or dip stick 10 has a mounting pin 11 positioned therethrough near its outer end so as to pivotally support a fixed blade 12 having bushings 13 engaged on the mounting pin 11. Secondary bushings 14 on the fixed blade 12 engage a secondary pin 15 on a piston rod 16 of a piston and cylinder assembly 17, the cylinder of which is pivotally attached to the boom or dip stick 10 by a transverse pivot pin 18. The fixed blade 12 is a unitary cast steel structure having parallel beams 19 in one portion thereof. A single unitary cast steel movable blade 21 is pivotally engaged on the fixed blade 12 by an adjustable shaft and thrust bearing arrangement located at 22 in the drawings of Figures 1 and 2 and illustrated in enlarged cross section in Figure 5 of the drawings wherein a shaft 23 is positioned transversely in the movable blade 21 in bushings 24 and against thrust bearings 25 and shims 26.

Figure 5:
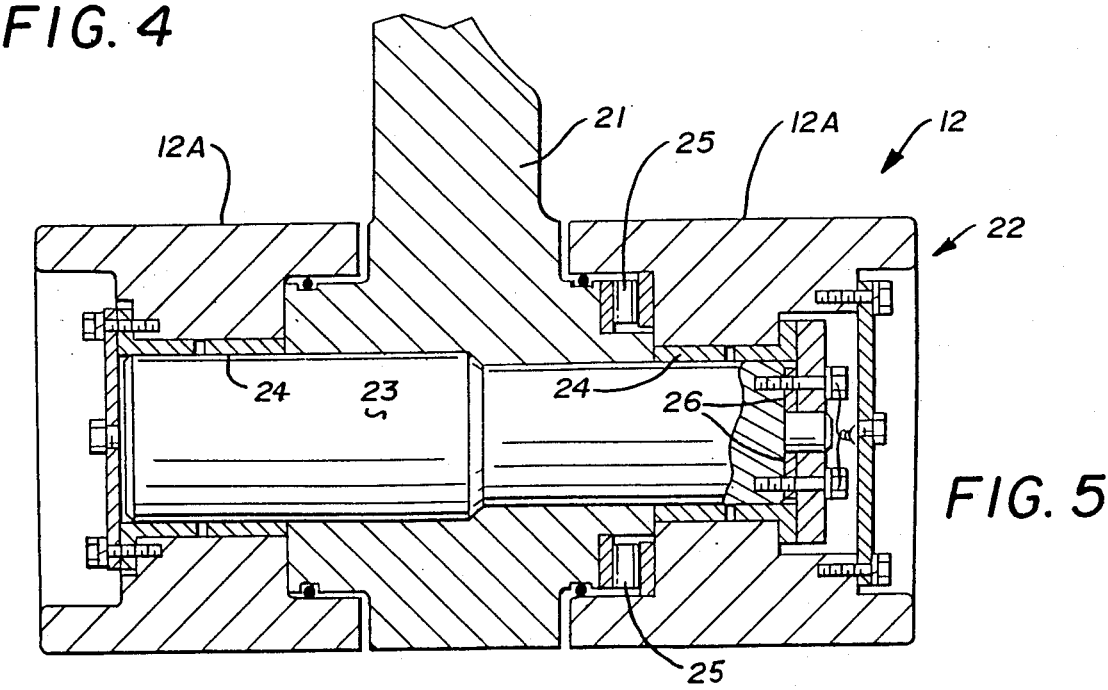
FIG. 5 is an enlarged cross section on line 5—5 of FIG. 2.

As shown in FIG. 5, cast movable blade 21 has openings of two different diameters which are only slightly larger than the diameter of shaft 23 which has a matching dual diameter shape. As shown, in FIG. 5, there are bushings 24 in the fixed blade 12 and there are thrust bearings 25 position in an annular area of the movable blade 21 at only one side thereof. The shaft 23 is positioned tightly in the movable blade 21 and it is retained therein by an end plate bolted to the right end of the shaft by shims 26. This arrangement is kept centered by an aperture in the end plate registering over a projecting stud on the end of shaft 23. The bolts may be removed and the shims replaced. By tightening the bolts shaft 23 may be adjusted and the thrust bearings 25 will be more tightly pressed against blade 21. The annular disposition of the thrust bearing 25 with respect to shaft 23 positively hold the blade 21 in proper alignment with respect to the fixed blade 12.

Figure 3:
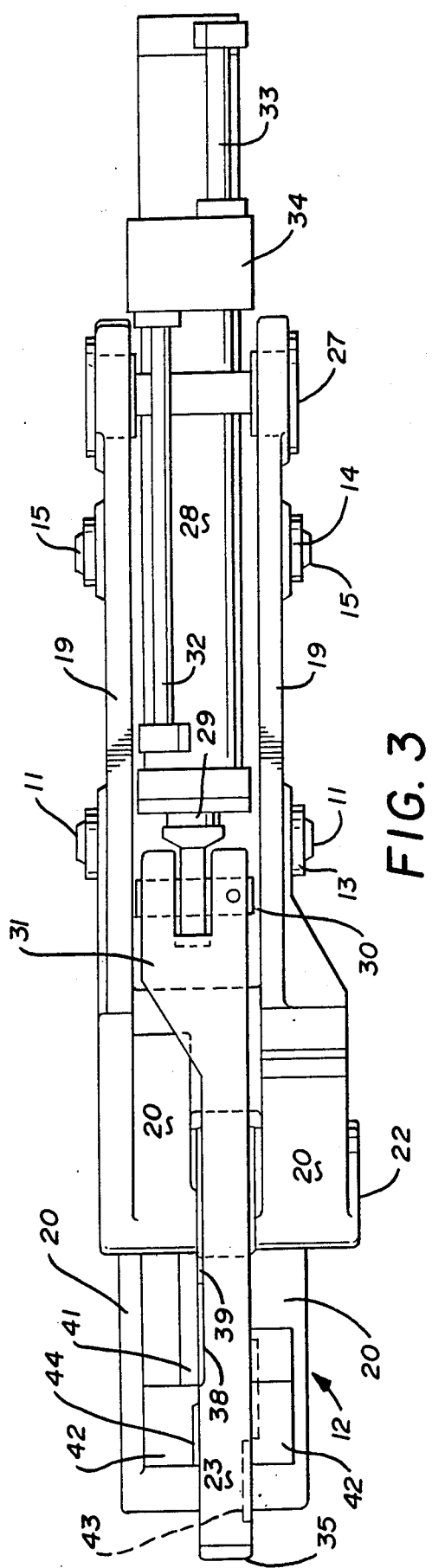
FIG. 3 is a top plan view of the shear seen in FIG. 1.
Figure 8:
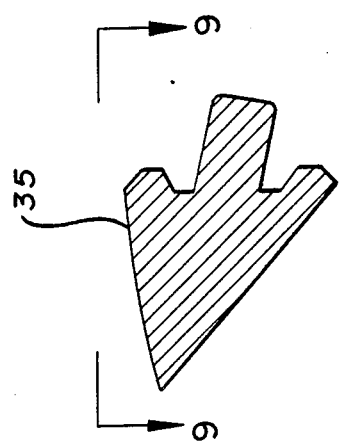
FIG. 8 is a side elevation of a hardened tip portion of the movable blade seen in FIGS. 1 and 2.
Figure 9:
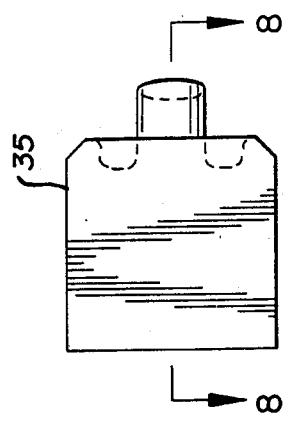
FIG. 9 is a top plan view of the hardened tip portion seen in FIG. 8.

By referring to FIGS. 1, 2 and 3 of the drawings, it will be seen that the fixed blade 12 is elongated and is secured inwardly of its ends to the mounting pins 11 and 15 of the boom 10 and piston rod 16 respectively by the horizontally spaced bushings 13 and 14 respectively. The beams 19 of the fixed blade 12, the right end as seen in FIGS. 1 and 2 of the drawings, carry a bifurcated bearing assembly 27 which pivotally positions a second hydraulic piston and cylinder assembly 28 between the spaced beams 19 of the fixed blade 12, the piston rod 29 of which is pivotally engaged on a transverse pin 30 in a bifurcated end 31 of the movable blade 21. Tubes 32 and 33 respectively communicate with the opposite ends of the hydraulic cylinder 28 and a central fitting 34 to which hydraulic fluid is selectively delivered by the hydraulic system of the backhoe on which the device is installed.

Still referring to FIGS. 1, 2 and 3 of the drawings, it will be seen that the movable blade 21 is generally hook-shaped and has a replaceable hardened cutting end portion 35 on its free end and first and second hardened cutting edge portions 36 and 37 which are attached to sections of the movable blade 21 which are angularly disposed with respect to one another at an angle of approximately 60°. As shown in FIG. 1, the bottom portion of cutting edge portion 35 and cutting edge 37 are disposed with respect to each other at an angle of approximately 90°. The cutting end portion 35 may, for example, be tack welded to the main body of the movable blade 21. The second hardened cutting edge portion 37 is of an overall length approximately one-third the length of the comparable length of the first hardened cutting edge portion 36 so that the modified V-shape formed by the hardened cutting edge portions 36 and 37 and the apex of the modified V-shape in particular lies relatively close to the point 22 where the shaft 23 pivotally mounts the movable blade 21 to the fixed blade 12 of the shear. The first and second hardened cutting edge portions 36 and 37 are positioned in recesses on the back side of the movable blade 21 as illustrated in FIGS. 1,2 and 3 of the drawings and are secured to the single unitary cast steel movable blade 21 by fasteners 38. A recess in the other side of the movable blade 21 has a hardened wear plate 39 secured therein by fasteners 40.

Still referring to FIGS. 1, 2, 3 and 7 of the drawings, it will be seen that the unitary cast steel fixed blade 12 has a raised hardened cutting edge portion 41 secured thereto by a plurality of fasteners, the raised hardened cutting edge portion 41 being located inwardly of one of a pair of spaced, upstanding primary guides 42 on a first outermost end of the fixed cast steel blade 12. Adjustable wear plates 43 are positioned on the other one of the guides 42 and the fixed blade 12. One of the guides 42 is positioned and sharpened for metal shearing engagement with all of the three hardened cutting portions 35, 36, and 37 of the movable blade 21 as hereinbefore described. The fixed blade 12 is relatively wider transversely than the movable blade 21 and is provided with a guide slot 44 between the guides 42 and through which the free end 35 of the movable blade 21 will first move as illustrated in broken lines in FIG. 2 of the drawings. It will be observed that when the hardened free end 35 has moved through the guide slot 44 in the center of the fixed blade 12, the angular cutting edge portions 36 and 37 of the movable blade 21 will move in shearing relation to the raised cutting portion 41 of the fixed blade 12 and cause a work piece being sheared to move along the hardened cutting portion 41 of the fixed blade 21 toward the pivot point 22 where it is caged. The shearing action takes place in substantially spaced relation to the body of the fixed blade 12, which can thus hold the work piece.

By referring again to FIG. 1 of the drawings, it will be seen that the movement of the movable blade 21 is responsive to the second hydraulic piston and cylinder assembly including the cylinder 28 and piston rod 29 with the cylinder 28 being pivoted midway between its ends to the inner end of the fixed blade 12 by the bearing and bushing assembly 27. The cylinder 28 and a major portion of the fixed blade 12 lie inwardly (to the right) of the pivot point 22.

It will occur to those skilled in the art that the pivotal mounting of this piston and cylinder assembly 28 as herein disclosed insures a positive shearing action as the shearing force is exerted between the fixed and the movable blades rather than between a movable blade and a portion such as the boom or dip stick of a backhoe as has heretofore been common in the art so that moving force on the movable blade 21 is at a right angle to the cutting portions thereof. The arrangement greatly increases the shearing force available and insures the piercing action of the end 35 in a work piece when desired.

Still referring to FIG. 1 of the drawings, it will be observed that the blade 12 being pivotally mounted on the end of the boom or dip stick 10 of a backhoe or similar machine enables the entire metal cutting shear to be manipulated relative to the boom or dip stick which enables the shear to be conveniently and easily used in dismantling operations, picking up and moving beams, pipes and sections of dismantled buildings and then shearing the same into appropriately sized scrap pieces with an unusual flexibility of motion as compared with the prior art devices.

The formation of the fixed blade and movable blade of the device as single unitary structures further contributtes to the unusual effectiveness and shearing ability of the device herein disclosed as the prior art devices have been built up of assembled and welded flame cut steel plate parts and the like.

It will thus be seen that by affixing the blade 12 to the boom 10 by the mounting pins 11 and 15 and actuating piston and cylinder assembly 17 of the backhoe or the like, the shear of the present disclosure may be conveniently and quickly mounted thereon by inserting the mounting pins 11 and 15 and securing them as will be understood by those skilled in the art.

Figure 4:
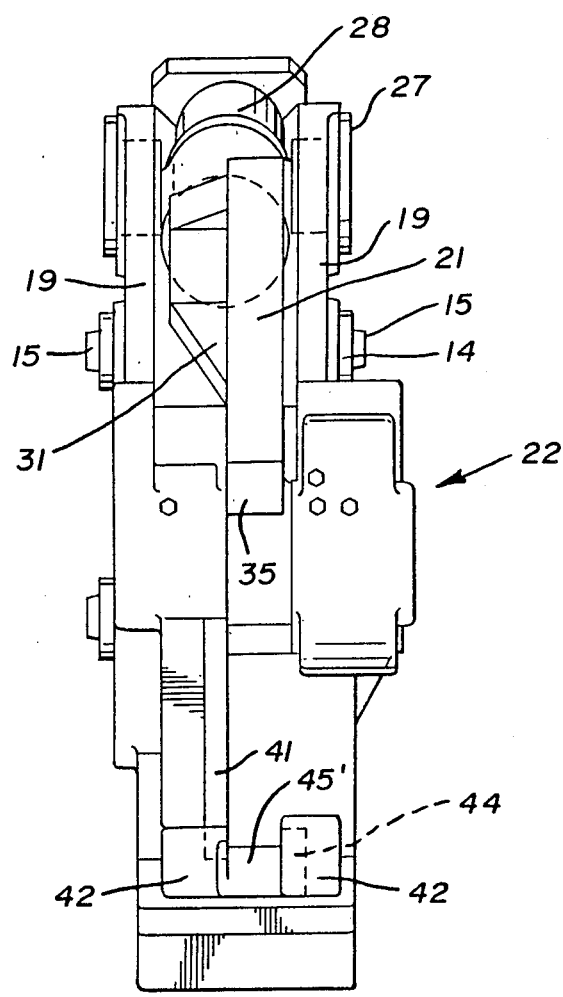
FIG. 4 is an end elevation of the shear seen in FIG. 2.

In FIGS. 3,4 and 6 of the drawings, the cast unitary fixed cutting blade 12 of the shear will be seen to include the horizontally spaced vertically positioned parallel beams 19 with longitudinally spaced horizontally positioned web sections 20 therebetewen defining one area in which an end of the boom 10 is pivotally positioned and in which the guide slot 44 is located.

By referring to FIG. 2 of the drawings, it will be seen that broken lines illustrate the positioning of the movable blade 21 of the shear and it will further be observed that the pivotal arrangement of the movable blade 21 to the fixed blade 12 by the hereinbefore described shaft 23 and its adjustable thrust bearings 25 enable the movable blade 21 to be adjustably positioned between horizontally spaced portions of the fixed blade 12 as defined by the extensions 12A fastened thereto.

By referring to FIG. 6 of the drawings, a section on line 6—6 of FIG. 2 illustrates the spacing of the beam portions 19 of the unitary cast steel fixed blade 12 and the positioning of the piston rod 16 therein where it is held by the pin 15 positioned through the tubular member which forms the bushing 14.

In FIG. 2 of the drawings, the pin 11 is illustrated and to which the end of the boom 10 is attached as hereinbefore described.

The positioning of the fixed blade 12 and the movable blade 21 of the present disclosure are substantially the same as the comparable fixed blade and movable blade and its V-shaped cutting edges as illustrated and described in our U.S. Pat. No. 4,450,625 which was a continuation-in-part of our application Ser. No. 261,679, now U.S. Pat. No. 4,376,340.

In the present invention, the mounting of the cylinder 28 between the beams 19 of the fixed blade 12 positions a large amount of the shear's weight behind the boom pivot 11 and enables the shear to be used at a greater distance from the backhoe than has heretofore been possible.

Although but one embodiment of the present invention has been illustrated and described, it will be apparent to those skilled in the art that various changes and modifications may be made therein without departing from the spirit of the invention and having thus described our invention, what we claim is:

1. A cutting and manipulating attachment for a backhoe having a boom with a controlled piston and cylinder assembly connected thereto comprising: a shear having an elongated, unitary cast steel fixed cutting blade having a raised cutting edge portion and removable means attaching said fixed cutting blade to said boom, said fixed cutting blade having horizontally spaced, vertically positioned, parallel beam portions and horizontal sections therebetween, a unitary cast steel movable cutting blade having first, second and third cutting edge portions, means inwardly of a first end of said fixed cutting blade pivotally mounting said movable cutting blade therebetween in pivotal relation to said fixed cutting blade from an open position to a closed work piece shearing position, wherein said first cutting edge portion is directly adjacent to said means for pivotally mounting, wherein the length of said first cutting edge portion is substantially less than the length of said second cutting edge portion and wherein the length of the first cutting edge portion is substantially less than the length of said raised cutting edge portion of said fixed blade to facilitate the cutting taking place relatively close to said means for pivotally mounting, said fixed blade and the movable blade being structured to urge a workpiece being cut to move along said fixed cutting blade toward said means for pivotally mounted and to generate an increased shearing force and means for keeping the cutting edge portions of said movable cutting blade in shearing relation to said raised cutting edge portion of said fixed cutting blade through the entire extent of the shearing movement of the blades with respect to each other, said third portion of said movable cutting blade being sharpened and being directed generally toward said fixed cutting blade, said means for keeping the cutting edge portions of said movable cutting blade in shearing relation to said raised cutting edge portion of said fixed cutting blade comprising a slot in one of said horizontal sections of said fixed cutting blade and inwardly of said first end thereof and defining an elongated guide path, said slot being positioned and sized to receive and maintain said sharpened end portion of said movable cutting blade and said cutting edge portions of said movable cutting blade in shearing relation to a work piece disposed between said blades.

2. A device as recited in claim 1 and wherein said spaced, parallel beam portions of said fixed cutting blade extend along said slot therein at an angle to said raised cutting portion of said fixed cutting blade.

3. A device as recited in claim 1 and wherein upstanding primary guides are positioned on said first end of said fixed cutting blade for guiding, holding, and shearing engagement with a work piece between said fixed and movable cutting blades.

4. A device as recited in claim 3 and wherein said cutting end portion is sharpened transversely and sharpened along one of its sides so as to cut a work piece crossways between said upstanding primary guides and cut said work piece along the side of one of said upstanding primary guides.

5. A device as recited in claim 1 and wherein detachable hardened cutting bars form said cutting edge portions of said fixed and movable cutting blades.

6. A device as recited in claim 5 wherein said detachable hardened cutting bars form said cutting edge portions of different lengths and are positioned so as to form an inverted V-shape.

7. A device as recited in claim 1 and wherein said first cutting edge portion is approximately one-third the length of said second cutting edge portion.

8. A device as recited in claim 1 and wherein said cutting end portion of said movable cutting blade is removably attached to said movable cutting blade, an extending portion of said cutting end portion being tack welded in a opening in said movable cutting blade.

9. A device as recited in claim 1 and wherein spaced members are removably secured to said fixed blade and said movable cutting blade is pivotally attached to said spaced members by a transverse shaft adjustably positioned in bores in said spaced members and engaged in bushings positioned in said spaced members on said fixed cutting blade.

10. A device as recited in claim 9 and wherein said spaced members are removably secured to said parallel beam portions of said fixed blade.

11. A device as recited in claim 1 wherein spaced members are removably attached to said elongated fixed cutting blade and said movable cutting blade is pivotally attached to said spaced members by a transverse shaft adjustably positioned in bores in said spaced members and engagd in bushings and engaged against thrust bearings in said spaced members on said fixed cutting blade.

12. A device as recited in claim 1 wherein said elongated fixed cutting blade comprises a unitary steel casting characterized by having a pair of horizontally spaced, vertically positioned parallel beams having upper and lower portions and longitudinally spaced interconnecting sections between said beams, some of which interconnect said upper portions of said beams and some of which interconnect said lower portions of said beams.

13. A device as recited in claim 12 and wherein said raised cutting portion of said elongated fixed cutting blade is positioned on one of said horizontally spaced vertically positioned beams and spaced vertically with respect to said interconnecting sections whereby a sheared work piece between said blades can move down and away from said raised cutting portion.

14. A device according to claim 1, further including a second piston and cylinder assembly pivotally engaged on a second end of said fixed cutting blade and means operatively connecting said movable cutting blade to said second piston and cylinder assembly so that the same can be moved relative to said fixed cutting blade thereby from said open to closed position and vice versa, and means on said fixed cutting blade in spaced relation to said means for pivotally attaching said fixed cutting blade to said boom of said backhoe operatively connecting said fixed cutting blade to said controlled piston and cylinder assembly so that said shear can be moved relative to said boom.

15. A device as recited in claim 14 and wherein said parallel beam portions and a horizontal section therebetween define a cavity in said fixed cutting blade and wherein said second piston and cylinder assembly is positioned substantially in said cavity.

16. A device as recited in claim 15 and wherein said second piston and cylinder assembly is pivoted midway between its ends to said parallel beam portions of said fixed cutting blade.

17. A device as recited in claim 15 further including means pivotally engaging said second piston and cylinder assembly and said movable blade and wherein when said cutting edge portions of said movable blade are in shearing relation to said raised cutting edge portion of said fixed cutting blade the second piston and cylinder assembly is positioned with respect to said cutting edge portion of said movable blade, such that a line, taken from the pivot point of said means for pivotally engaging at an angle of about 90° with respect to the second piston and cylinder longitudinal axis, will pass through at least one of said cutting edge portions of said movable blade.

18. A device as recited in claim 14 and wherein said parallel beam portions and horizontal sections therebetween define oppositely disposed first and second cavities in said fixed cutting blade and said means on said fixed cutting blade for pivotally attaching said boom to said fixed cutting blade is positioned substantially in said first cavity and said second piston and cylinder assembly is positioned substantially in said second cavity.

19. A device according to claim 1, wherein said means for pivotally mounting said movable cutting blade includes a shaft having a first predetermined diameter portion and a second predetermined diameter portion and means connected to said second predetermined diameter portion to tightly position said movable blade on said means for pivotally mounting.

20. A cutting and manipulating attachment for a backhoe having a boom with a controlled piston and cylinder assembly connected thereto comprising: a shear having an elongated, cast steel fixed cutting blade having a raised cutting edge portion and removable means pivotally attaching said fixed cutting blade to said boom, said fixed cutting blade having horizontally spaced, vertically positioned parallel beam portions and horizontally disposed sections therebetween, a cast steel movable hook-shaped blade having first, second and third cutting edge portions, means inwardly of a first end of said fixed cutting blade pivotally mounting said hook-shaped movable cutting blade therebetween in movable relation to said fixed cutting blade from an open position to a closed work piece shearing position, wherein said first cutting edge portion is directly adjacent to said means for pivotally mounting, wherein the length of said first cutting edge portion is substantially less than the length of said second cutting edge portion, and wherein the length of first cutting edge portion is substantially less than the length of said raised cutting edge portion of said fixed blade to facilitate the cutting taking place relatively close to said means for pivotally mounting, said fixed blade and the movable blade being structured to urge a workpiece being cut to move along said fixed blade toward said means for pivotally mounting and to generate an increased shearing force, means for keeping the cutting edge portions of said hook-shaped cutting blade in shearing relation to said raised cutting edge portion of said fixed cutting blade through the entire extent of the shearing movement of the blades with respect to each other, said third cutting end portion of said hook-shaped movable cutting blade having a sharpened end portion directed generally toward said fixed cutting blade, and a second piston and cylinder assembly pivotally engaged on a second end of said elongated fixed cutting blade and means operatively connecting said hook-shaped movable cutting blade to said second piston and cylinder assembly so that the same can be moved in an arcuate path relative to said fixed cutting blade thereby from said open to closed position and vice versa.

21. A device according to claim 20, wherein said means for pivotally mounting said movable cutting blade includes a shaft having a first predetermined diameter portion and a second predetermined diameter portion and means connected to said second predetermined diameter portion to tightly position said movable blade on said means for pivotally mounting.

* * * * *